United States Patent
Kang et al.

(10) Patent No.: US 10,622,727 B2
(45) Date of Patent: Apr. 14, 2020

(54) COMMUNICATION APPARATUS AND METHOD IN VEHICLE

(71) Applicants: ZN Technologies Co., Ltd., Ulsan (KR); UNIST (ULSAN NATIONAL INSTITUTE OF SCIENCE AND TECHNOLOGY), Ulsan (KR)

(72) Inventors: Chang Soo Kang, Yongin-si (KR); Chulgyun Park, Seoul (KR); Na Young Kim, Seoul (KR); Franklin Bien, Ulsan (KR)

(73) Assignees: ZN Technologies Co., Ltd., Ulsan (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 15/552,834

(22) PCT Filed: Dec. 12, 2016

(86) PCT No.: PCT/KR2016/014523
§ 371 (c)(1),
(2) Date: Aug. 23, 2017

(87) PCT Pub. No.: WO2018/110717
PCT Pub. Date: Jun. 21, 2018

(65) Prior Publication Data
US 2018/0241134 A1 Aug. 23, 2018

(51) Int. Cl.
*H01Q 21/06* (2006.01)
*H04N 7/18* (2006.01)
(Continued)

(52) U.S. Cl.
CPC ............ *H01Q 21/065* (2013.01); *B60R 1/00* (2013.01); *B60R 16/023* (2013.01); *B60R 16/03* (2013.01); *H02J 50/10* (2016.02); *H04B 5/00* (2013.01); *H04B 5/0037* (2013.01); *H04B 7/0613* (2013.01); *H04N 5/22521* (2018.08); *H04N 5/225251* (2018.08); *H04N 5/232* (2013.01); *H04N 5/23241* (2013.01);
(Continued)

(58) Field of Classification Search
None
See application file for complete search history.

(56) References Cited

U.S. PATENT DOCUMENTS

| 2009/0244282 | A1* | 10/2009 | Eguiguren | H04N 7/183 348/148 |
| 2011/0013020 | A1 | 1/2011 | Jo | |

(Continued)

FOREIGN PATENT DOCUMENTS

KR  101334391  11/2013

*Primary Examiner* — Lindsay J Uhl
(74) *Attorney, Agent, or Firm* — Kolisch Hartwell, P.C.

(57) ABSTRACT

A camera apparatus includes a camera module configured to generate an input image, and a transceiving circuit configured to encode and modulate the input image and to provide an electric and/or magnetic first signal. Also, the camera apparatus includes an antenna attached to a metal body of a vehicle and configured to form an electromagnetic field on the metal body and to propagate the first signal received from the transceiving circuit by carrying the first signal in the electromagnetic field.

9 Claims, 9 Drawing Sheets (51) Int. Cl.
*B60R 16/023* (2006.01)
*B60R 1/00* (2006.01)
*H04N 5/225* (2006.01)
*H04B 5/00* (2006.01)
*H04N 5/232* (2006.01)
*B60R 16/03* (2006.01)
*H04B 7/06* (2006.01)
*H02J 50/10* (2016.01)
*B60R 11/00* (2006.01)
*H01Q 1/32* (2006.01)
*B60R 11/04* (2006.01)
*H01P 3/08* (2006.01)

(52) U.S. Cl.
CPC ............. *H04N 7/183* (2013.01); *B60R 11/04* (2013.01); *B60R 2011/004* (2013.01); *B60R 2300/406* (2013.01); *H01P 3/085* (2013.01); *H01Q 1/3208* (2013.01); *H01Q 1/3275* (2013.01)

(56) References Cited

U.S. PATENT DOCUMENTS

| | | | | |
|---|---|---|---|---|
| 2011/0254746 A1* | 10/2011 | Park | ........................ | H01P 3/081 343/713 |
| 2014/0252813 A1* | 9/2014 | Lee | ........................ | H02J 17/00 297/180.12 |
| 2017/0133756 A1* | 5/2017 | Eastburg | ................ | H01Q 1/523 |
| 2017/0149123 A1* | 5/2017 | Kim | ..................... | H01Q 1/3275 |

* cited by examiner

COMMUNICATION APPARATUS AND METHOD IN VEHICLE

TECHNICAL FIELD

The following description relates to a communication apparatus and method, and more particularly, to an apparatus for transmitting and receiving an image signal from a side of a vehicle to another side.

BACKGROUND ART

In a vehicle, various sensors or parts are connected to each other via wires. A rear view camera or a black box camera that monitors a rear side of the vehicle is also connected via a wire to supply power and transmit an image.

However, due to the above wired connection, installation of rear view cameras or black box cameras for monitoring a rear view distributed in the aftermarket may be avoided. The wired connection may make it difficult to install a camera and may incur costs. Also, a vehicle may be damaged by, for example, drilling a steel plate of the vehicle. When a camera is removed from a vehicle because the camera is not used, a trace may remain.

To replace the wired connection, a related art discloses an attempt to wirelessly transmit an image using a radio frequency (RF). In the following patent documents, some examples are shown.

Korean Registration Patent Publication No. 10-1334391, published on Nov. 29, 2013, discloses a multichannel vehicle black box that includes a wireless communication module to wirelessly transmit an image.

U.S. Patent Publication No. 2011/0013020, published on Jan. 20, 2011, discloses a communication network that wirelessly transmits a vehicle rear view camera image.

DISCLOSURE OF INVENTION

Technical Solutions

According to an aspect of the present invention, there is provided a camera apparatus installed and used in a vehicle. The camera apparatus may include a camera module configured to generate an input image; a transceiving circuit configured to encode and modulate the input image and to provide a first signal; and an antenna attached to a metal body of the vehicle and configured to form an electromagnetic field on the metal body and to propagate the first signal received from the transceiving circuit by carrying the first signal in the electromagnetic field.

The antenna may include a first layer formed of a conductive material and including at least one aperture facing the metal body; a second layer formed of a conductive material and located adjacent to the first layer; and a third layer formed of a dielectric material, located between the first layer and the second layer and configured to exchange electromagnetic waves with the metal body so that the first signal is carried in the electromagnetic field.

The first layer may include nine apertures in a 3×3 array.

The antenna may be further configured to receive power from an electromagnetic wave propagated through the metal body and to provide the power to the transceiving circuit, and the transceiving circuit may be further configured to supply power to the camera module through a converter.

At least one of the first layer and the second layer may include a copper material. The third layer may include at least one of a carbon fiber, acryl and polycarbonate.

According to another aspect of the present invention, there is provided an image processing apparatus that receives an image from a camera installed in a vehicle. The image processing apparatus may include an antenna attached at a first position of a metal body of the vehicle and configured to receive a first signal corresponding to the image when a camera-side antenna attached at a second position of the metal body forms an electromagnetic field and propagates the first signal by carrying the first signal in the electromagnetic field; and a transceiving circuit configured to modulate and decode the first signal and to provide the first signal as the image.

The antenna may include a first layer formed of a conductive material and including at least one aperture facing the metal body; a second layer formed of a conductive material and located adjacent to the first layer; and a third layer formed of a dielectric material, located between the first layer and the second layer, and configured to receive the first signal by exchanging electromagnetic waves with the metal body.

At least one of the first layer and the second layer may include a copper material. The third layer may include at least one of a carbon fiber, acryl and polycarbonate.

When a voltage supplied from a battery of the vehicle and/or a power source of the vehicle is converted and transferred, the transceiving circuit may be further configured to transfer power to the antenna and the antenna may be further configured to form an electromagnetic field on the metal body and propagate the power to the camera-side antenna.

BEST MODE FOR CARRYING OUT THE INVENTION

Hereinafter, example embodiments will be described in detail with reference to the accompanying drawings. The scope of the right, however, should not be construed as limited to the example embodiments set forth herein. In the following description, like drawing reference numerals are used for like elements, even in different drawings.

All terms used herein are selected from general terms being used in the related arts. Yet, the meanings of the terms used herein may be changed depending on a change and/or development of technologies, a custom, or preference of an operator in the art. Accordingly, the terms are merely examples to describe the example embodiments, and should not be construed as limited to the technical idea of the present disclosure.

Also, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

Configuration of Communication System

A communication system according to example embodiments includes a camera apparatus for transmitting an image, and an image processing apparatus for receiving an image and processing the image. According to a related art, a process of transmitting image data from a camera apparatus to an image processing apparatus is performed by, for example, a wired communication or a radio frequency (RF)-based wireless communication. However, according to example embodiments, image data may be transmitted from the camera apparatus to the image processing apparatus by a metal material communication (or a magnetic field communication) that employs a body of a vehicle as a medium for a communication. Also, the image processing apparatus may transmit a power supplied to the vehicle to the camera apparatus, to transfer an operating power of the camera apparatus.

According to an example embodiment, a camera apparatus may be a rear view camera of a black box for multichannel vehicles. However, this is merely an example, and different types of products may be used. For example, one of a front view camera, a rear view camera, a left side view camera and a right side view camera that form an omniview or omnivision camera system that is recently provided as an optional item by automakers. As described above, the camera apparatus may transmit an image using an electromagnetic field induction scheme in a metal body of a vehicle instead of transmitting an image using a separate wire similarly to the related art.

The camera apparatus may include a camera module configured to generate an input image, and a transceiving circuit configured to encode and modulate the input image and to provide a first signal (hereinafter, refers to an electrical signal and/or magnetic signal). Also, the camera apparatus may include an antenna that is attached to the metal body of the vehicle and that is configured to form an electromagnetic field on the metal body and to propagate the first signal received from the transceiving circuit by carrying the first signal in the electromagnetic field. A configuration of the antenna will be further described with reference to FIGS. 3 and 4.

According to an example embodiment, an image processing apparatus may receive an image from the camera apparatus through the metal body using a metal material communication, and may process the image. The image processing apparatus may include an antenna attached at a first position of the metal body. When a camera apparatus-side antenna attached at a second position of the metal body forms an electromagnetic field on the metal body and propagates a first signal corresponding to the image by carrying the first signal in the electromagnetic field, the antenna at the first position may receive the first signal. The image processing apparatus may also include a transceiving circuit configured to modulate and decode the first signal and provide the first signal as the image.

Figure 1:
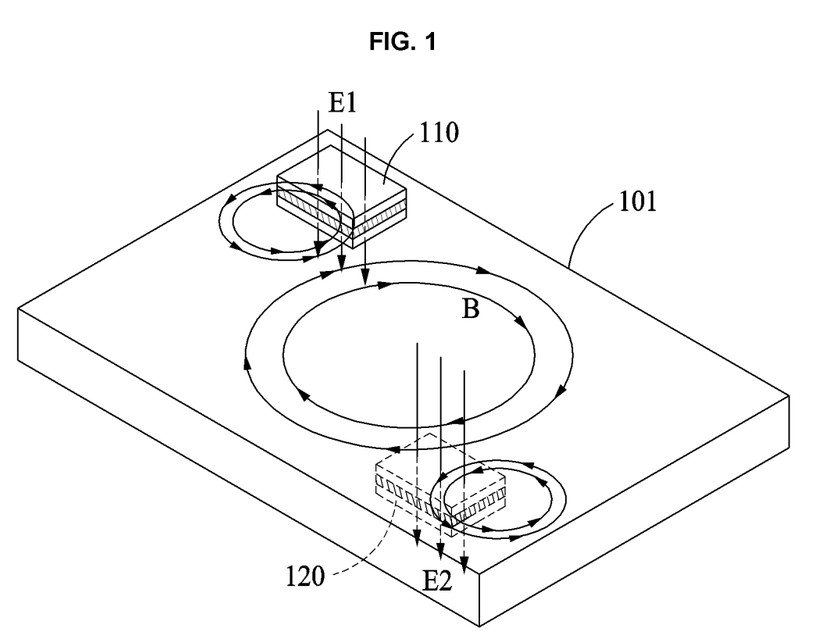
FIG. 1 is a diagram illustrating a principle of transmitting an image through a metal body of a vehicle according to an example embodiment.

A principle of transmitting an image through a metal body of a vehicle is described with reference to FIG. 1. FIG. 1 is a diagram illustrating a principle of transmitting an image through a metal body of a vehicle according to an example embodiment. A metal medium 101 may include, for example, a steel plate or a frame of a body of a vehicle. An example in which the metal medium 101 is a magnetic material and an example in which the metal medium 101 is a diamagnetic material will be described.

Example of Using Magnetic Material as Metal Medium

Conductive layers of a first antenna 110 may form a first electromagnetic field on a dielectric layer. By the first electromagnetic field, a second electromagnetic field in which a magnetic field is dominant may be formed on the metal medium 101 that is a propagation medium. A first electric field E1 among generated electromagnetic fields may be propagated orthogonally to the metal medium 101 through an aperture of the first antenna 110. The propagated first electric field E1 may form a second electromagnetic field B in which a magnetic field is dominant in the metal medium 101.

Based on a similar structure and principle by a reversibility theory, a second antenna 120 of a receiver may receive energy from the second electromagnetic field formed in the metal medium 101. In the above process, a change in the second electromagnetic field B in which the magnetic field is dominant may be transferred in a dielectric layer to an electromagnetic field E2 in which an electric field is dominant, through an aperture of the second antenna 120.

Since a magnetic field is dominant in the above metal material communication, impedance may slightly change despite a change in a shape and size of the metal medium 101. Also, since a permeability of the metal medium 101 is greater than that of air, an efficiency of propagation of a radio wave through the metal medium may be superior to that of a communication system in which radio waves propagate through the air.

For example, a steel may have a permeability of about 2,000 and a pure iron may have a permeability of about 4,000 to 5,000, which indicates that the permeability of the steel and the permeability of the pure iron are about 2,000 times and about 4,000 to 5,000 times greater than a permeability of air, respectively. In other words, a magnetic field may be much more strongly and farther propagated in a magnetic material in comparison to when the magnetic field is propagated in the air. Accordingly, a communication through the metal medium 101, that is, a magnetic material may allow an electromagnetic field to be farther propagated than a magnetic field communication through the air. To form an electromagnetic field in which a magnetic field is dominant, a resonator and a circuit may need to be designed so that an electric field with a predetermined magnitude is formed in a metal body.

For example, a propagation efficiency of a metal medium with a high permeability may increase, and a electromagnetic field propagation distance may vary depending on a wavelength of an operating frequency. Due to the electromagnetic field formed on the metal medium 101, energy may be transferred to a resonator spaced apart by a predetermined distance from a metal medium. Since a magnetic field is dominant in the electromagnetic field formed on the metal medium 101, an electric field may be radiated from the metal medium 101. Accordingly, an antenna resonating at an operating frequency may receive energy when the antenna is within a predetermined distance from the metal medium 101.

A dielectric of a dielectric layer of the first antenna 110 or the second antenna 120 may reduce a thickness and size of a resonator, and may form the electromagnetic field B in which the magnetic field is dominant on the metal medium 101, to transfer a sufficient amount of energy.

Example of Using Paramagnetic Material or Diamagnetic Material as Metal Medium

For example, by a current supplied to a conductive layer, an electromagnetic field E1 in which an electric field is dominant may be formed on the metal medium 101. In this example, the electromagnetic field B in which the magnetic field is dominant may not be formed on the metal medium 101 by the electric field that is radiated from an aperture. This is because a permeability of each of a paramagnetic material and a diamagnetic material is similar to that of the air. Accordingly, in the metal medium 101 that is a paramagnetic material or a diamagnetic material, an electromagnetic field may be propagated at a similar intensity to that of a propagation of a magnetic field in the air, not a higher intensity, similarly to a ferromagnetic material. In other words, distance in which a magnetic field is propagated in the air or a metal body may be similar.

A pure iron that is a ferromagnetic material may have a permeability of 4,000 to 5,000 and aluminum that is a paramagnetic material or silver that is a diamagnetic material may have a permeability of about 1.0, and accordingly a magnetic field may be propagated in the metal body at different intensities. In this example, a signal may be propagated to the receiver by a current induced from a layer in contact with the metal medium 101 among conductive layers of the antenna to the metal medium 101. Also, an electric field radiated from an aperture may be induced to the metal body, and accordingly a signal or power may be transmitted.

Structure of Antenna Part

Figure 2:
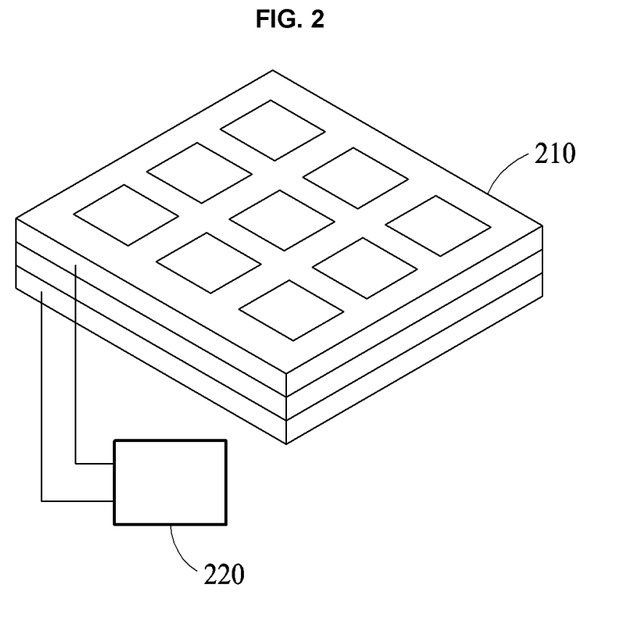
FIG. 2 is a diagram illustrating an antenna and a transceiving circuit according to an example embodiment.

FIG. 2 illustrates an antenna 210 and a transceiving circuit 220 according to an example embodiment. The antenna 210 includes a first layer that includes apertures and that is formed of a conductive material to face a metal medium, a second layer formed of a conductive material and located in an opposite side to the first layer, and a third layer formed of a dielectric material and located between the first layer and the second layer.

Figure 3:
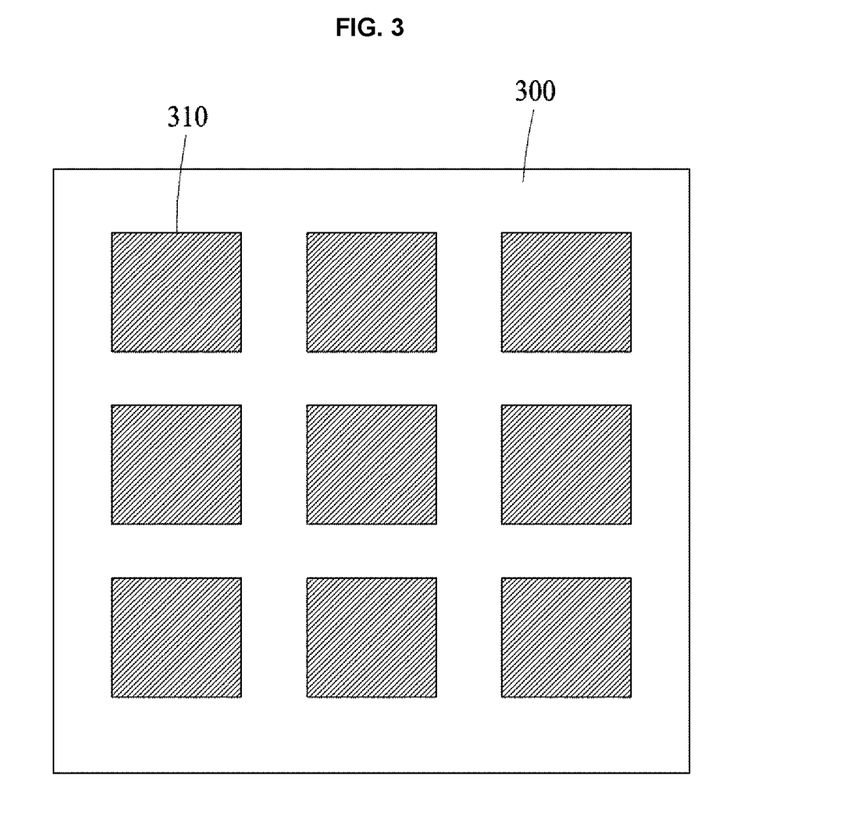
FIG. 3 is a plan view of an antenna according to an example embodiment.

A structure of an antenna is also described with reference to FIG. 3. FIG. 3 illustrates a plan view of an antenna 300 according to an example embodiment. For example, the first layer and/or the second layer may include, but is not limited to, nine apertures 310 in a 3×3 array. However, a number of apertures may be determined based on an application and a communication environment. Thus, the first layer and the second layer may have a single aperture or a plurality of apertures, however, may not have an aperture depending on circumstances. For example, an aperture may have a circular shape or polygonal shape, and have a size that is determined to transfer a sufficient amount of energy by forming an electromagnetic field in which a magnetic field is dominant on a metal medium.

A thickness of each layer may be determined based on a wavelength and a skin depth so that an electromagnetic field in which a magnetic field is dominant may be formed on a metal medium to transfer a sufficient amount of energy. Other layers with different electric characteristics may be added to the first layer or the second layer in an opposite direction to the third layer. In an example, another dielectric layer may be added onto the first layer, to induce a formation of a strong electromagnetic field. In another example, a nonconductor may be added onto the first layer to prevent an electric connection to a metal medium.

Figure 4:
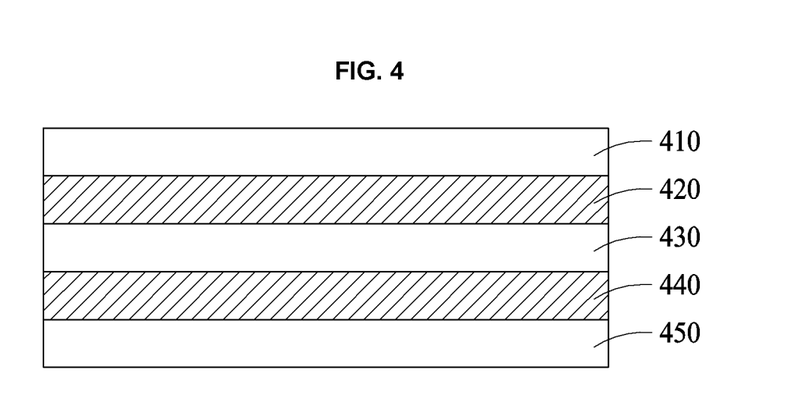
FIG. 4 is a side view of an antenna according to an example embodiment.

The third layer that is an intermediate layer between the first layer and the second layer may include a dielectric or a nonconductor. The third layer may include, but is not limited to, for example, at least one of a carbon fiber, acryl and polycarbonate. Also, the third layer may include, for example, paint, paper or a polymer resin film. In addition, the third layer may include a plurality of layers with different characteristics, a plurality of dielectrics, or a nonconductor. An example of a configuration of an antenna with at least two dielectric layers is shown in FIG. 4. FIG. 4 illustrates a side view of an antenna according to an example embodiment. Dielectric layers 420 and 440 are located between conductive layers 410, 430 and 450, for example, copper. A number of dielectric layers or a thickness of each of the dielectric layers may be designed and changed based on an application or a communication environment, and detailed specifications may be determined to transfer enough energy to form an electromagnetic field in which a magnetic field is dominant on a metal medium.

Although an example of a waveguide antenna has been basically described above, other types of antennas may be used by designing a resonator with a structure to form an electromagnetic field in which a magnetic field is dominant in a metal body. For example, a patch antenna, or a horn antenna may be used.

Example of Additional Magnetic Field Induction

A ferromagnetic material may be attached to the metal medium 101 in advance, to induce a strong magnetic field to the metal body. For example, a dielectric or nonconductor may be attached onto the first layer, and a ferromagnetic material may be attached onto the dielectric or nonconductor. The first layer may be placed on the metal medium.

The attached ferromagnetic material may form a strong magnetic field, and accordingly the magnetic field may be induced to the metal medium to form a stronger magnetic field in comparison to inducing of a magnetic field directly into the metal body. For example, when the attached ferromagnetic material is a refined steel or Mu-metal with a permeability of about 100,000 to 200,000, a much stronger magnetic field may be formed on the metal body. Also, a method of winding a coil around a ferromagnetic material and attaching the ferromagnetic material to a metal body while generating a magnetic field in the ferromagnetic material may be used.

Transceiving Circuit

Referring back to FIG. 2, the transceiving circuit 220 may be a circuit device configured to convert a signal transmitted and received from and to the antenna 210 that is a resonator into a meaningful signal. A circuit for transmission and a circuit for reception may be separately provided. The transceiving circuit may include a power supply circuit configured to operate a circuit or to supply a sufficient amount of power to a resonator, and a battery for the power system. A transmission circuit may have a similar structure to a structure of a transmission system of a general wireless communication, however, may additionally require a circuit configured to allow the resonator to radiate a sufficient amount of power. For example, a power amplifier (amp) or an automatic gain controller (AGC) may be required. A receiver may have a similar structure to a structure of a receiver of a general wireless communication system.

Used Frequency

Although there is no particular limitation to a frequency used for a communication, it is possible to select an optimum frequency based on characteristics of data to be transmitted, a communication environment, and the like. A relationship between frequencies and antenna sizes (for example, a length of a side of the antenna 300 of FIG. 3) is shown in Table 1 below.

TABLE 1

|  | 150 mm | 100 mm | 60 mm |
|---|---|---|---|
| Frequency f (Hz) | 25000000 | 25000000 | 25000000 |
| Light velocity C (m/s) | 300000000 | 300000000 | 300000000 |
| Wavelength λ (m) | 12 | 12 | 12 |
| Wavelength in waveguide λg (m) | 7.236 | 7.500 | 7.500 |
| Aperture (λgmm) | 4.146 | 2.667 | 1.600 |
| Side gap (λgmm) | 1.382 | 0.933 | 0.800 |
| termediate gap (λgmn) | 2.764 | 1.733 | 0.800 |
| Copper T (λgmm) | 0.041 | 0.040 | 0.040 |
| Dielectric T (λgmm) | 0.138 | 0.133 | 0.267 |

Operating Power

A transmission and reception power was tested in a band of 27 megahertz (MHz) for an audio communication (radio set), instead of an image communication. The testing was performed in the following environment:

Standby power: 1.794 W (regardless of an antenna size)
Transmission power
Antenna size 150 mm×150 mm: 22.08 W
Antenna size 100 mm×100 mm: 21.39 W
Antenna size 60 mm×60 mm: 10.35 W
Reception power
Antenna size 150 mm×150 mm: 2.76 W
Antenna size 100 mm×100 mm: 3.45 W
Antenna size 60 mm×60 mm: 6.21 W A rated voltage of 13.8 V was measured using a tester through a radio circuit in the testing, and a distance between a transmission antenna and a reception antenna is about 1 meter (m).

Currents measured in the testing are shown as below.

TABLE 2

| Antenna Size | State | Tx | Rx |
|---|---|---|---|
| 60 mm × 60 mm | Standby | 0.13 (A) | 0.13 (A) |
|  | Acting | 0.75 (A) | 0.45 (A) |
| 100 mm × 100 mm | Standby | 0.13 (A) | 0.13 (A) |
|  | Acting | 1.55 (A) | 0.25 (A) |
| 150 mm × 150 mm | Standby | 0.13 (A) | 0.13 (A) |
|  | Acting | 1.60 (A) | 0.20 (A) |

The measured currents changed based on an audio signal level, and a value of the measured currents is an average value.

Transmission of Power

According to an example embodiment, a transmission and reception of power may be performed as well as a data communication. A power may be transmitted similarly to a signal transmission, and accordingly a communication apparatus according to example embodiments may be a power transmitter or a power receiver. A power transmission circuit of the power transmitter may convert a direct current (DC) output from a power outlet into an analog signal or an RF signal, and may transmit a converted power through a power transmission resonator (hereinafter, is the same as an antenna in a signal transmission).

A power reception circuit (hereinafter, is the same as an antenna in a signal reception) of the power receiver may receive an analog signal or RF signal radiated through a power transmission resonator of the power transmitter, using a power reception resonator of the power receiver, may convert the received the analog signal or RF signal to a DC, and may supply a power to a required circuit. In an example, an additionally required voltage may be converted by a DC-to-DC converter and supplied, if necessary. In another example, when the power receiver includes a battery, the battery may be charged, or a power may be supplied to a required circuit while charging the battery.

Example of System for Transmission of Camera Image for Vehicles

Figure 5:
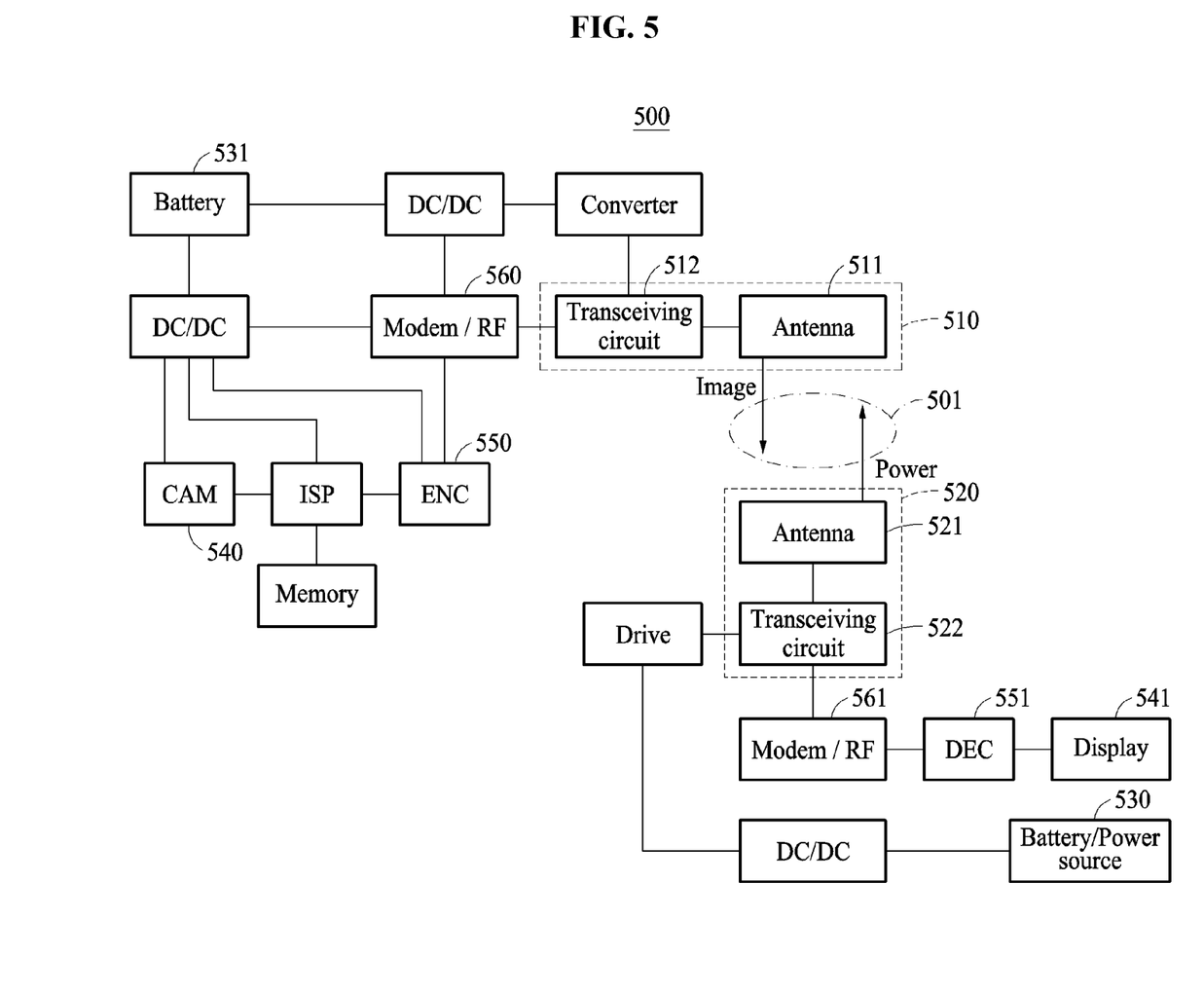
FIG. 5 is a block diagram illustrating a configuration of a system according to an example embodiment.

FIG. 5 is a block diagram illustrating a configuration of a system according to an example embodiment. In a related art, a part 501 to transmit image data from a camera apparatus to an image processing apparatus and to supply a power depends on a wired connection. As described above, recently, attempts to transmit image data via an RF-based wireless communication are being made, however, a battery needs to be charged or a separate power outlet needs to be connected due to a difficulty in power supply. According to an example embodiment, a part 501 for a data transmission and power supply may be implemented by a power transmission and a metal material communication using a metal body of a vehicle as a medium.

In the block diagram, a part 510 near a camera apparatus and a part 520 near an image processing apparatus may be added adjacent to the part 501 for a communication and power transmission to a general configuration of a rear black box (or a rear view camera) according to the related art.

The part 510 may include an antenna 511 and a transceiving circuit 512, and the part 520 may include an antenna 521 and a transceiving circuit 522. Power supplied from a battery 530 of the vehicle (or a power source provided by the vehicle, for example, generated by the vehicle) may be transferred from the part 520 to the part 510 through a converter and a driver. A power transfer process is the same as those described above. The power may be transferred from the part 510 to a camera 540 through a converter and a battery 531.

An image captured by the camera may be transferred to the part 510 again by passing through an image signal processor ISP via an encoder ENC 550 and a modem 560. Also, image data may be transferred from the part 510 to the part 520, as described above. A signal transferred to the part 520 may be provided on a display 541 through a modem 561 and a decoder DEC 551.

Appearance of Vehicle with Camera Apparatus

Figure 6:
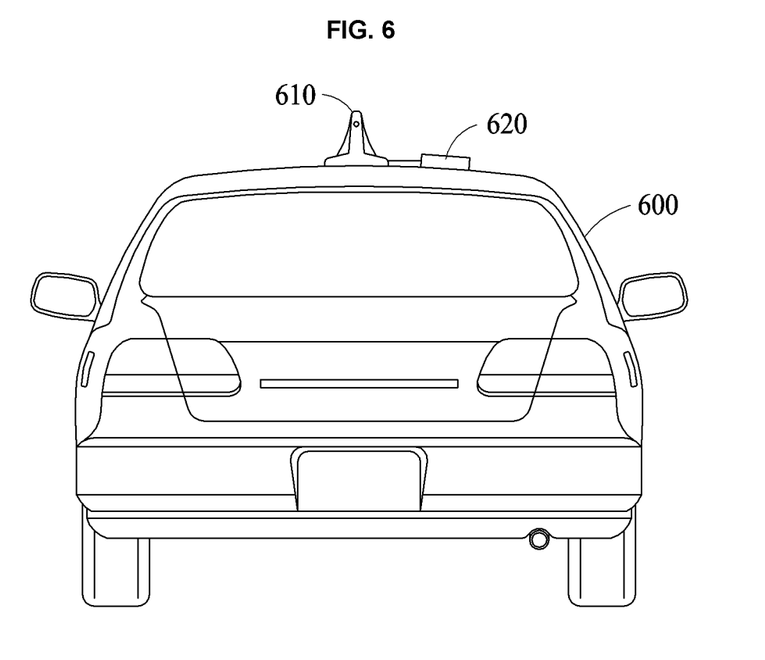
FIG. 6 is a diagram illustrating a vehicle in which a camera apparatus is installed according to an example embodiment.
Figure 7:
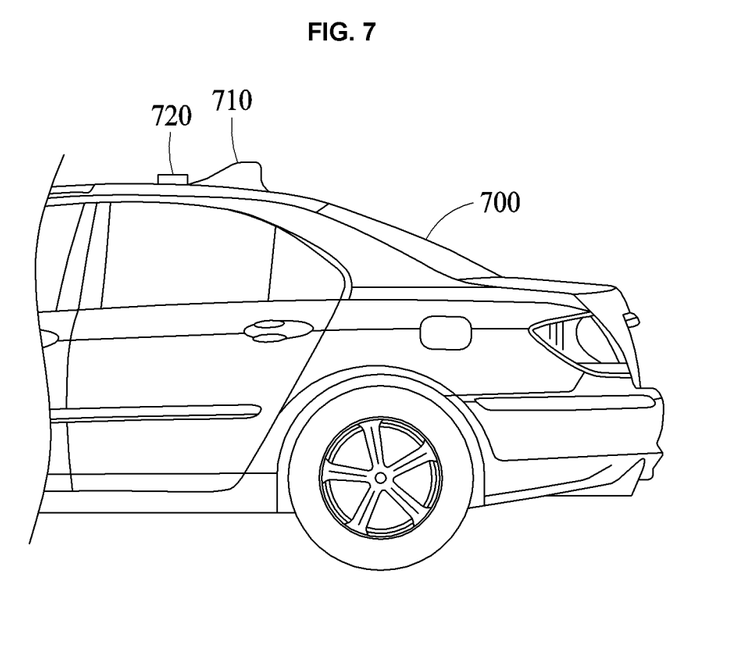
FIG. 7 is a side view of a vehicle in which a camera apparatus is installed according to an example embodiment.

FIGS. 6 and 7 illustrate examples of a vehicle 600 in which a camera apparatus is installed according to an example embodiment. A structure 610 with a camera may include a transceiving circuit, and may exchange signals and/or power using an electromagnetic field communication scheme via an antenna 620 installed in contact with a steel plate of a roof of the vehicle. As shown in FIG. 7, an antenna 720 for a metal material communication may be attached at an arbitrary position of a vehicle 700, and may be attached near a structure 720 with a camera. Although not shown in the drawings, the structure 710 and the antenna 720 may be implemented as a single device.

FIGS. 6 and 7 illustrate examples in which a camera module and an antenna are attached outside the vehicle, however, there is no limitation thereto. For example, the camera module and the antenna may be installed at an arbitrary position in the vehicle. In this example, the antenna may be installed in contact with an arbitrary metal medium of the vehicle, for example, a door or a pillar of the vehicle. As described above, the above camera apparatus may provide various benefits. When a black box or a side view/rear view camera that is not included by default in a vehicle is installed in an aftermarket and is to operate, various difficulties in, for example, drilling the vehicle or inserting a line between interior materials, exist in the related art. However, according to example embodiments, a camera apparatus may not need to be connected via a wire separately from an image processing apparatus (that is generally installed near a driver's seat).

Although a transmission of image data has been described merely as an example, various types of sensors that are installed in a vehicle recently, for example, an ultrasonic sensor, a light intensity sensor, a rain sensor, light detection and ranging (LiDAR) or LADAR, may transfer measured values to a controller of the vehicle using the same scheme. Thus, according to example embodiments and modifications thereof, it is possible to greatly reduce wiring in a vehicle. Therefore, it is possible to expect additional gains, for example, a reduction in manufacturing costs of vehicles, an increase in a fuel efficiency due to a weight reduction, and the like.

Large Vehicle

Figure 8:
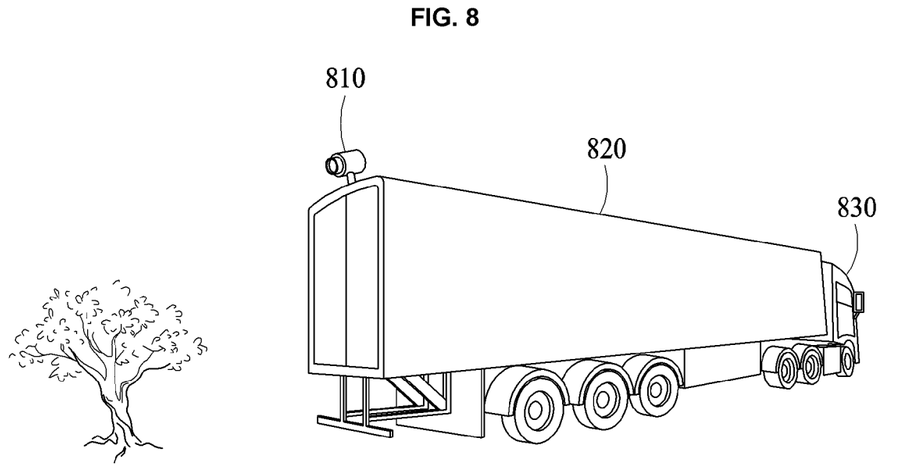
FIG. 8 is a diagram illustrating a large vehicle in which a camera apparatus is installed according to an example embodiment.

A camera apparatus according to an example embodiment may also be useful in large vehicles, for example, buses, trailers or trucks. FIG. 8 illustrates a large vehicle in which a camera apparatus is installed according to an example embodiment. A large vehicle, for example, a truck or bus, may be exposed to a risk of an accident caused by a failure to properly monitor a rear side or blind spot. Despite many attempts to install a rear view camera and/or side view camera in a large vehicle, it is difficult to connect wiring from a camera part to a part near a driver's seat in the large vehicle.

Figure 9:
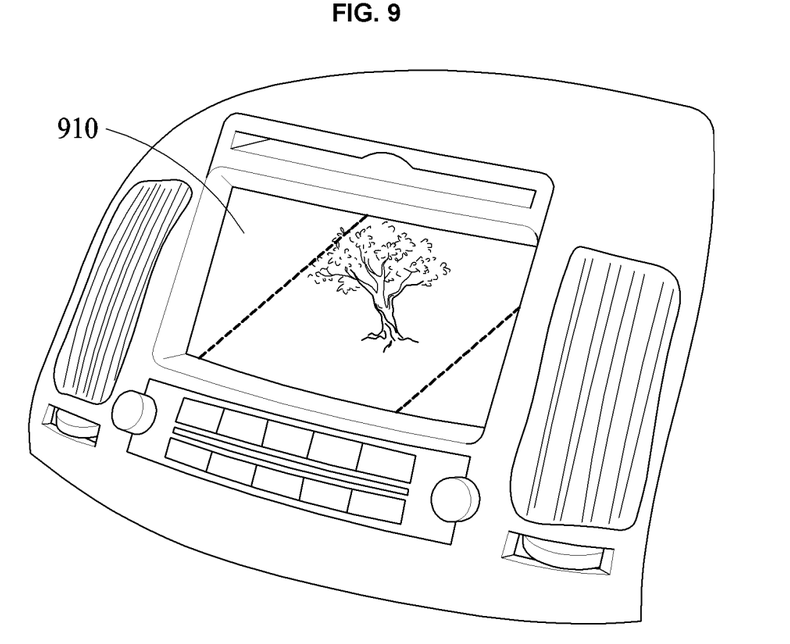
FIG. 9 is a diagram illustrating a display of a transmitted image according to an example embodiment.

When a camera apparatus 810 for a magnetic field communication using a metal body 820 of the large vehicle as a communication medium is installed as described above, a communication may be performed without separate wiring to a driver's seat 830. A structure thereof is the same as described above, and a screen 910 of FIG. 9 may be provided to a driver.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents. Thus, other implementations, alternative embodiments and equivalents to the claimed subject matter are construed as being within the appended claims.

We claim:

1. A camera apparatus installed and used in a vehicle, the camera apparatus comprising:
   a camera module configured to generate an input image;
   a transceiving circuit configured to encode and modulate the input image and to provide a first signal; and
   an antenna attached to a metal body of the vehicle and configured to form an electromagnetic field on the metal body and to propagate the first signal received from the transceiving circuit by carrying the first signal in the electromagnetic field through the metal body of the vehicle wherein the antenna comprises:
   a first layer formed of a conductive material and comprising at least one aperture facing the metal body;
   a second layer formed of a conductive material and located adjacent to the first layer; and
   a third layer formed of a dielectric material, located between the first layer and the second layer;
   wherein the first layer and the second layer are configured to form a first electromagnetic field on the third layer that further generates a second electromagnetic field with a dominant magnetic field on the metal body of the vehicle so that the first signal is carried by the second electromagnetic field.

2. The camera apparatus of claim 1, wherein the first layer includes nine apertures in a 3×3 array.

3. The camera apparatus of claim 1, wherein the antenna is further configured to receive power from an electromagnetic wave propagated through the metal body and to provide the power to the transceiving circuit, and the transceiving circuit is further configured to supply power to the camera module through a converter.

4. The camera apparatus of claim 1, wherein at least one of the first layer and the second layer comprises a copper material.

5. The camera apparatus of claim 1, wherein the third layer comprises at least one of a carbon fiber, acryl and polycarbonate.

6. An image processing apparatus that receives an image from a camera installed in a vehicle, the image processing apparatus comprising:
   an antenna attached at a first position of a metal body of the vehicle and configured to receive a first signal corresponding to the image when a camera-side antenna attached at a second position of the metal body forms an electromagnetic field and propagates the first signal by carrying the first signal in the electromagnetic field;
   wherein the camera-side antenna comprises:
   a first layer formed of a conductive material and comprising at least one aperture facing the metal body;
   a second layer formed of a conductive material and located adjacent to the first layer;
   a third layer formed of a dielectric material, located between the first layer and the second layer, and
   wherein the first layer and the second layer are configured to form a first electromagnetic field on the third layer that further generates a second electromagnetic field with a dominant magnetic field on the metal body of the vehicle so that the first signal is carried by the second electromagnetic field to the antenna at the first position; and
   a transceiving circuit configured to modulate and decode the first signal and to provide the first signal as the image.

7. The image processing apparatus of claim 6, wherein at least one of the first layer and the second layer comprises a copper material.

8. The image processing apparatus of claim 6, wherein the third layer comprises at least one of a carbon fiber, acryl and polycarbonate.

9. The image processing apparatus of claim 6, wherein when a voltage supplied from a battery of the vehicle or a power source of the vehicle is converted and transferred, the transceiving circuit is further configured to transfer power to the antenna and the antenna is further configured to form an electromagnetic field on the metal body and propagate the power to the camera-side antenna.

* * * * *